United States Patent
Bickford et al.

(10) Patent No.: US 9,619,609 B1
(45) Date of Patent: Apr. 11, 2017

(54) INTEGRATED CIRCUIT CHIP DESIGN METHODS AND SYSTEMS USING PROCESS WINDOW-AWARE TIMING ANALYSIS

(71) Applicant: GLOBALFOUNDRIES INC., Grand Cayman (KY)

(72) Inventors: Jeanne P. Bickford, Essex Junction, VT (US); Eric A. Foreman, Fairfax, VT (US); Susan K. Lichtensteiger, Essex Junction, VT (US); Mark W. Kuemerle, Essex Junction, VT (US); Jeffrey G. Hemmett, St. George, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 36 days.

(21) Appl. No.: 14/862,652

(22) Filed: Sep. 23, 2015

(51) Int. Cl.
G06F 17/50 (2006.01)

(52) U.S. Cl.
CPC ...... *G06F 17/5081* (2013.01); *G06F 17/5031* (2013.01); *G06F 2217/78* (2013.01); *G06F 2217/84* (2013.01)

(58) Field of Classification Search
CPC ............. G06F 2217/78; G06F 2217/84; G06F 17/5031

(Continued)

(56) References Cited

U.S. PATENT DOCUMENTS 7,844,932 B2  11/2010 Buck et al.
8,103,990 B2   1/2012 Idgunji et al.

(Continued)

FOREIGN PATENT DOCUMENTS

WO  WO 2009035813 A1  3/2009
WO  WO 2010004668 A1  1/2010
WO  WO 2011119244 A1  9/2011

OTHER PUBLICATIONS

Sengupta, Anirban, et al; "Automated exploration of datapath and unrolling factor during power-performance tradeoff in architectural synthesis using multi-dimensional PSO algorithm." Expert Systems with Applications 41, No. 10 (2014): 4691-4703.

(Continued)

*Primary Examiner* — Stacy Whitmore
(74) *Attorney, Agent, or Firm* — Gibb & Riley, LLC; David A. Cain, Esq.

(57) ABSTRACT

Design methods and systems disclosed use a process window-aware timing analysis of an integrated circuit (IC) chip design for improved accuracy. Specifically, a process distribution for the design is defined and divided into process windows. Timing parameter adjustment factors are assigned to the process windows. A timing analysis is performed in order to acquire an initial solution for a timing parameter (e.g., delay, slack or slew). For each specific process window, this initial solution is adjusted by the predetermined timing parameter adjustment factor assigned to that specific process window. The adjusted solutions for the different process windows account for process window-to-process window variations in the widths of distribution of a process parameter (e.g., leakage power) and can be used to predict whether IC chips manufactured according the IC chip design will meet established timing requirements (e.g., required arrival times (RATs)) regardless of where they fall within the process distribution.

20 Claims, 7 Drawing Sheets

(58) Field of Classification Search
USPC .............. 716/106, 105, 109, 132, 133, 134
See application file for complete search history.

(56) References Cited

U.S. PATENT DOCUMENTS

| | | |
|---|---|---|
| 8,141,012 B2 | 3/2012 | Buck et al. |
| 8,381,150 B2 | 2/2013 | Zolotov et al. |
| 8,739,076 B2 | 5/2014 | Isoyan |
| 2005/0138588 A1 | 6/2005 | Frenkil |
| 2007/0089077 A1 | 4/2007 | Sumikawa |
| 2007/0250797 A1 | 10/2007 | Engel et al. |
| 2009/0217221 A1 | 8/2009 | Anemikos et al. |
| 2014/0123097 A1 | 5/2014 | Chang et al. |
| 2016/0313394 A1* | 10/2016 | Arsovski ............ G01R 31/2894 |

OTHER PUBLICATIONS

Lee, Ji-Young, et al; "Effect of line-edge roughness (LER) and line-width roughness (LWR) on sub-100-nm device performance." InMicrolithography 2004, pp. 426-433. International Society for Optics and Photonics, 2004.

\* cited by examiner

INTEGRATED CIRCUIT CHIP DESIGN METHODS AND SYSTEMS USING PROCESS WINDOW-AWARE TIMING ANALYSIS

FIELD OF THE INVENTION

The present disclosure relates to integrated circuit (IC) chip design and, more particularly, to integrated circuit (IC) chip design methods, systems and computer program products, which use a process window-aware timing analysis.

BACKGROUND

Generally, the goals of integrated circuit (IC) chip design are to optimize total power consumption, IC device density, timing and various other parameters (e.g., electrical parameters) in order to develop products that meet desired performance specifications at a relatively low-cost and within a relatively fast turn-around time. IC chip design typically begins with a high-level description of the IC. This high-level description sets out the requirements for the IC chip and is stored on a data storage device in, for example, a hardware description language (HDL), such as VHDL or Verilog. A logic synthesis tool can synthesize the high-level description into low-level constructs. For example, in the case of application-specific integrated circuit (ASIC) design the high-level description can be synthesized into a gate-level netlist using library elements (e.g., standard cells in standard cell ASIC design or gate array base cells in gate array ASIC design). After logic synthesis, a placement tool can establish placement (i.e., location on the IC chip) of the library elements. Then, a routing tool can perform routing and, more particularly, can define the wires that will interconnect the library elements. Following routing, a timing analysis tool can perform a timing analysis. For example, a static timing analysis (STA) tool can be used to predict the performance of an IC chip and to verify that the IC chip will function correctly. That is, STA can be used to predict the arrival times of clock and data signals and the results can be compared against established timing requirements (e.g., required arrival times (RATs)) to see if the integrated circuit, as designed, will function properly with a sufficiently high probability. Logic synthesis, placement, routing, and timing can be iteratively repeated, as necessary, to generate the final IC design. Since the final IC design is based on the results of a timing analysis, it is imperative that the timing analysis be as accurate as possible.

SUMMARY

In view of the foregoing, disclosed herein are design methods, systems and computer program products, which use a process window-aware timing analysis of an integrated circuit (IC) chip design for improved accuracy. Specifically, a process distribution for the IC chip design can be defined and divided into process windows. Timing parameter adjustment factors can be assigned to the process windows. A timing analysis can be performed on the IC chip design in order to acquire an initial solution for a timing parameter (e.g., for delay, for slack, for slew, etc.). For each specific process window within the process distribution, this initial solution can be adjusted by a predetermined timing parameter adjustment factor assigned to that specific process window. The adjusted solutions for the different process windows can account for process window-to-process window variations in the widths of distribution of a process parameter (e.g., leakage power) that impacts the timing parameter and can be used to predict whether IC chips that are manufactured according to the design will meet established timing requirements (e.g., required arrival times (RATs)) regardless of where they fall within the process distribution.

More particularly, disclosed herein are integrated circuit (IC) chip design methods. In the methods, a process distribution for an initial integrated circuit (IC) chip design can be accessed and divided into process windows. Models for a process parameter (e.g., leakage power), which can impact a timing parameter (e.g., delay, slack, slew or any other timing parameter), can be generated for each of the process windows. Based on the models, the widths of distribution for the process parameter in the process windows, respectively, can be determined. Based on the widths of distribution of the process parameter, timing parameter adjustment factors can be assigned to the process windows, respectively. A timing analysis (e.g., a statistical static timing analysis (SSTA)) can then be performed in order to acquire an initial solution for the timing parameter. Once the initial solution for the timing parameter is determined that value can be adjusted for each specific process window in order to account for process window-to-process window variations in the widths of distribution of the process parameter. Specifically, for each specific process window, an adjusted solution can be determined for the timing parameter by adjusting the initial solution using a specific timing parameter adjustment factor that was previously assigned to the specific process window. Given the adjusted solutions, a prediction can be made regarding whether or not IC chips manufactured according to the initial IC chip design will meet one or more predetermined timing requirements (e.g., required arrival time(s) (RAT(s))) regardless of where those IC chips fall within the process distribution. When a predetermined timing requirement will not be met, the initial IC chip design can be altered and the processes of determining the widths of distribution, assigning the timing parameter adjustment factors, performing the timing analysis and determining whether the IC chip design (as altered) meets the predetermined timing requirement can be iteratively repeated. When the predetermined timing requirement(s) will be met, the IC chip design can be finalized and IC chips can be manufactured according to the final IC chip design.

Also disclosed herein are integrated circuit (IC) chip design systems. The systems can each incorporate a memory and at least one processor in communication with that memory. The memory can store an IC chip design and a process distribution for that IC chip design. The processor(s) can access the IC chip design and the process distribution from the memory and can perform various processes within the IC chip design flow. Specifically, the processor can divide the process distribution into process windows. The processor can generate models for a process parameter (e.g., leakage power), which can impact a timing parameter (e.g., delay, slack, slew, or any other timing parameter), for each of the process windows. The processor can further determine the widths of distribution for the process parameter in the process windows, respectively, based on the models. The processor can further assign timing parameter adjustment factors to the process windows, respectively, based on the widths of distribution of the process parameter. The processor can further perform a timing analysis (e.g., a statistical static timing analysis (SSTA)) in order to acquire an initial solution for the timing parameter. Once the initial solution for the timing parameter is determined, the processor can, for each specific process window, adjust that initial value in order to account for process window-to-process window variations in the widths of distribution of the process parameter. Specifically, for each specific process window, the processor can determine an adjusted solution for the timing parameter by adjusting the initial solution using a specific timing parameter adjustment factor that was previously assigned to the specific process window. Given the adjusted solutions, the processor can predict whether or not IC chips manufactured according to the IC chip design will meet one or more predetermined timing requirements. When a predetermined timing requirement will not met, the processor can alter the IC chip design and iteratively repeat the processes of determining the widths of distribution, assigning the timing parameter adjustment factors, performing the timing analysis and determining whether the IC chip design (as altered) meets the predetermined timing requirement. When the predetermined timing requirement(s) will be met, the processor can finalize the IC chip design and release the final IC chip design for manufacturing.

Also disclosed herein is a computer program product. The computer program product incorporates a computer readable storage medium having program instructions embodied therewith. The program instructions can be executable by a computer to cause the computer to perform the above-described method.

BRIEF DESCRIPTION OF THE SEVERAL VIEWS OF THE DRAWINGS

The present invention will be better understood from the following detailed description with reference to the drawings, which are not necessarily drawn to scale and in which.

DETAILED DESCRIPTION

As mentioned above, the goals of integrated circuit (IC) chip design are to optimize total power consumption, IC device density, timing and various other parameters (e.g., electrical parameters) in order to develop products that meet desired performance specifications at a relatively low-cost and within a relatively fast turn-around time. IC chip design typically begins with a high-level description of the IC. This high-level description sets out the requirements for the IC chip and is stored on a data storage device in, for example, a hardware description language (HDL), such as VHDL or Verilog. A logic synthesis tool can synthesize the high-level description into low-level constructs. For example, in the case of application-specific integrated circuit (ASIC) design the high-level description can be synthesized into a gate-level netlist using library elements (e.g., standard cells in standard cell ASIC design or gate array base cells in gate array ASIC design). After logic synthesis, a placement tool can establish placement (i.e., location on the IC chip) of the library elements. Then, a routing tool can perform routing and, more particularly, can define the wires that will interconnect the library elements. Following routing, a timing analysis tool can perform a timing analysis. For example, a static timing analysis (STA) tool can be used to predict the performance of an IC chip and to verify that the IC chip will function correctly. That is, STA can be used to predict the arrival times of clock and data signals and the results can be compared against established timing requirements (e.g., required arrival times (RATs)) to see if the integrated circuit, as designed, will function properly with a sufficiently high probability. Logic synthesis, placement, routing, and timing can be iteratively repeated, as necessary, to generate the final IC design. Since the final IC design is based on the results of a timing analysis, it is imperative that the timing analysis be as accurate as possible.

In view of the foregoing, disclosed herein are design methods, systems and computer program products, which use a process window-aware timing analysis of an integrated circuit (IC) chip design for improved accuracy.

More specifically, as mentioned above, one goal of IC chip design is the optimization and, particularly, the minimization of total power consumption. Those skilled in the art will recognize that there are two components to total power consumption: dynamic power consumption and leakage power consumption. Dynamic power consumption refers to the amount of power required to operate an IC chip and is proportional to the value of the supply voltage (Vdd) squared and to the frequency of operation. Leakage power consumption refers to the amount of power consumed by the IC chip when it is inactive and is proportional to the value of the supply voltage (Vdd) and to the leakage current.

IC chip designers have realized that process parameter variations have a significant impact on IC chip performance (e.g., on operating speed). Such process parameter variations are due to variations that occur during manufacturing and include, but are not limited to, variations in channel length, channel width, doping, spacer width, etc. The full process distribution for an IC chip design refers to the performance range for IC chips manufactured according to the same design and operating using the same voltage supply (e.g., a nominal operating voltage). This performance range extends from IC chips with relatively fast operating speeds (e.g., $-3\sigma$ fast IC chips) at one end of the full process distribution (i.e., the "fast" end of the process distribution) to IC chips with relatively slow operating speeds (e.g., from $3\sigma$ slow IC chips) at the opposite end of the full process distribution (i.e., the "slow" end of the process distribution). An IC chip at the "fast" end of the process distribution (i.e., an IC chip with a relatively fast operating speed) may consume an excessive amount of dynamic power and/or leakage power (i.e., may violate a maximum total power constraint), whereas another IC chip at the "slow" end of the process distribution (i.e., an IC chip with a relatively slow operating speed) may not meet an IC chip timing requirement (e.g., a required arrival time (RAT)).

Selective voltage binning is a technique that was developed in order to reduce power consumption at the "fast" end of the process distribution, while increasing operating speed at the "slow" end of the process distribution. Specifically, in selective voltage binning, the full process distribution for the IC chip design is defined based on actual performance measurements taken from IC chips manufactured according to the design. The process distribution is then divided into successive intervals (referred to as process windows) and different voltage ranges are assigned to each successive interval (i.e., to each process window) such that relatively low voltage ranges are assigned to intervals at the "fast" end of the process distribution and relatively high voltage ranges are assigned to intervals at the "slow" end of the process distribution. The IC chips are assigned to different groups based on performance measurements (e.g., delay measurements). These different groups are referred to as voltage bins and correspond to the successive intervals (i.e., the process windows), described above. This process of assigning the IC chips to the different groups is referred to as selective voltage binning. When such IC chips are shipped for incorporation into products, the voltage ranges associated their respective voltage bins are noted. Operation of relatively fast IC chips at lower voltage ranges minimizes worst-case power consumption and operation of relatively slow IC chips at higher voltage ranges improves their performance (e.g., increases their operating speed/reduces their delay).

In the present design methods, systems and computer program products, the full process distribution can be defined prior to manufacturing (e.g., based on a best case/worst case analysis), as opposed to after manufacturing based on the actual performance measurements taken from the manufactured IC chips. The process distribution can then be divided into some number (M) of process windows and different predetermined timing parameter adjustment factors can be assigned to the each of the process windows. The timing analysis can be performed in order to acquire an initial solution for a timing parameter (e.g., for delay, for slack, for slew, etc.). To improve timing analysis accuracy, this initial solution can be adjusted for each specific process window by a predetermined timing parameter adjustment factor assigned to that specific process window. The adjusted solutions can account for process window-to-process window variations in the widths of distribution of a process parameter (e.g., leakage power) that impacts the timing parameter and can be used to determine whether IC chips manufactured according to the IC chip design will meet established timing requirements (e.g., required arrival times (RATs)) regardless of where those IC chips fall within the process distribution.

Figure 1:
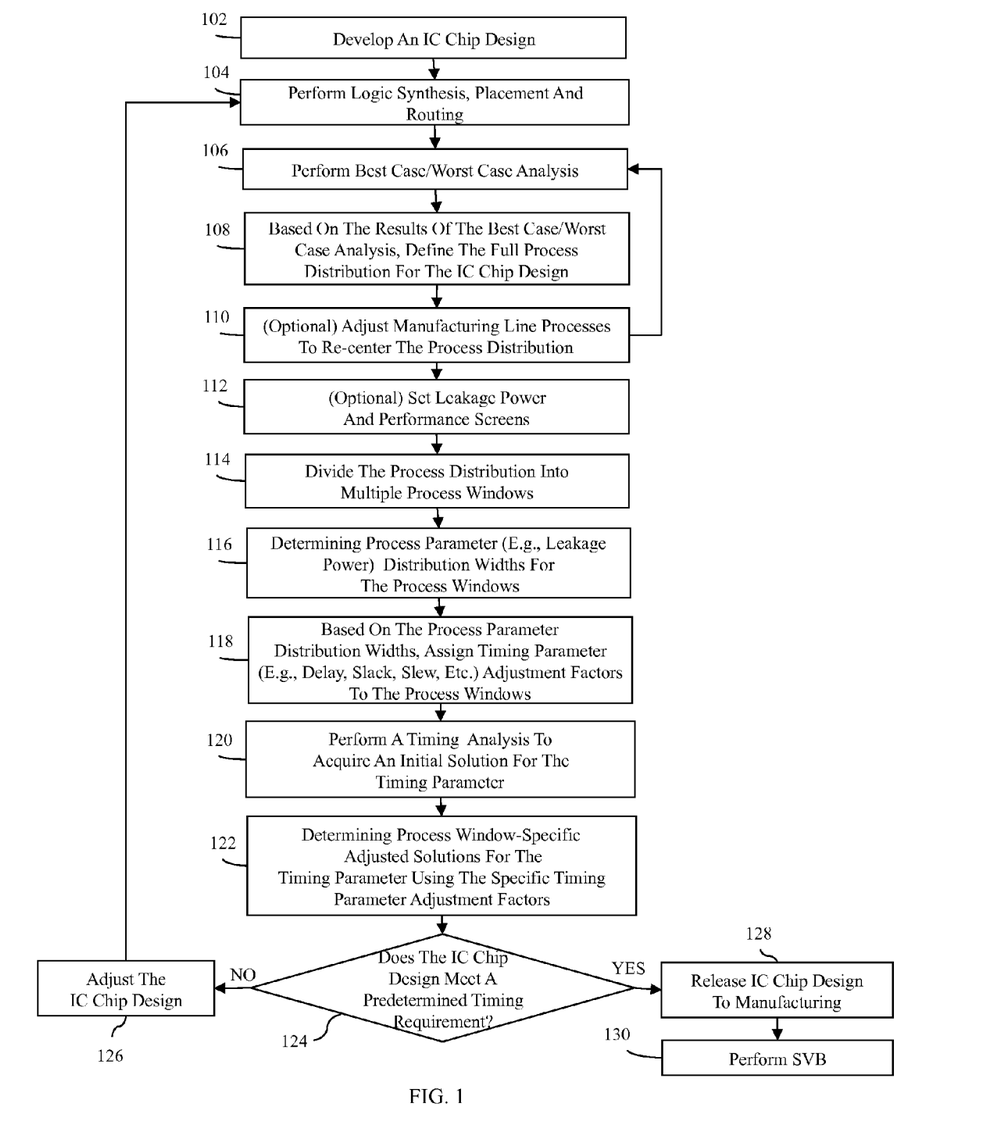
FIG. 1 is a flow diagram illustrating an integrated circuit (IC) design method.

More particularly, referring to the flow diagram of FIG. 1, disclosed herein are integrated circuit (IC) chip design methods.

In the methods, an initial design for an integrated circuit (IC) chip can be developed and stored in a memory (102). The initial design developed at process 102 can be represented by a high-level description, which sets out the requirements for the IC chip. This high-level description can be stored in memory (e.g., on a data storage device) in, for example, a hardware description language (HDL), such as VHDL or Verilog. Those skilled in the art will recognize that this high-level description will set out specifications for various parameters (e.g., for channel length, channel width, doping, spacer width, etc.). However, the actual values of those parameters may vary due to manufacturing process variations and, as a result, may impact the performance (e.g., operating speed, as indicated by delay) of manufactured IC chips.

Following development of the initial design, logic synthesis, placement and routing can be performed to generate a design layout (104). Specifically, during logic synthesis, the high-level description can be synthesized into low-level constructs (e.g., a gate-level netlist) using library elements (e.g., standard cells in standard cell ASIC design or gate array base cells in gate array ASIC design). After logic synthesis, placement can be performed. That is, the specific locations for placement of the various library elements on the IC chip can be established. After placement, routing can be performed. That is, the wires that will interconnect the various library elements can be defined. Various different techniques for performing logic synthesis, placement and routing are well known in the art. Thus, the details of such techniques are omitted from this specification in order to allow the reader to focus on the salient aspects of the disclosed methods.

Next, a best case/worst case (or 'fast/slow') analysis of can be performed given the design layout (106). A best case/worst case analysis can be performed, for example, by performing a Statistical Static Timing Analysis (SSTA). In a SSTA a single timing run may be performed in a parameterized fashion over a multi-dimensional process space to model process and environmental variations. Specifically, IC gate responses to varying conditions can be captured in the timing models during library characterization using detailed Simulation Program with Integrated Circuit Emphasis (SPICE) simulation models, which accurately predict IC device physics over a range of process and environmental conditions. In addition to modeling process and environmental variations, which are typically assumed to be constant across any single IC chip (often referred to as 'chip-to-chip variation'), a SSTA can also consider Systematic and Random Across Chip Variation (ACV), which accounts for both the systematic variation between devices that increases with spatial separation, as well as the uncorrelated random variation that can exist between even neighboring devices as a result of, for example, line width variation, random dopant fluctuation, etc. The chip-to-chip process and environmental variations are assumed to be constant for a given chip (e.g., if gate A is operating at fast process, all other gates on the same chip are also operating at fast process) and the purpose of modeling chip-to-chip variation is primarily to ensure that as chips are manufactured and operate over a varying set of process and environmental conditions, sufficient functioning chips are manufactured to result in an acceptable yield. In contrast, the modeling of ACV variation is more concerned with ensuring that all chips at any given process point are functional in the presence of ACV. This is often achieved using a concept of "Early" and "Late" timing. To ensure functional hardware, the clock and data signals must be synchronized such that the data does not arrive at a latching element too early relative to the clock and be latched into the incorrect clock cycle (a 'hold test'). Similarly, the data signal also should not arrive too late and miss the intended latching clock signal (a "setup test"). This is ensured by assuming the ACV variation results in the earliest possible arrival time for data signals and the latest possible arrival time for clock signals for hold tests, and vice versa for setup tests. The ACV data itself may be modeled, in order of increasing accuracy, using scalars (e.g. early/late are modeled as −/+5% of nominal, to provide a trivial example), as linear combinations of existing characterized data, or via direct characterization of ACV from SPICE. It should also be noted that the ACV conditions themselves can vary as a function of chip-to-chip Process and Environmental variation; e.g. the split between an Early and Late delay for a given piece of IP can vary significantly between fast and slow Process. In summary, the SSTA timing models accurately predict chipto-chip best case/worst case process and environmental variation, as well as 'Early/Late' across chip variation, typically obtained from SPICE based transient simulation.

Figure 2:
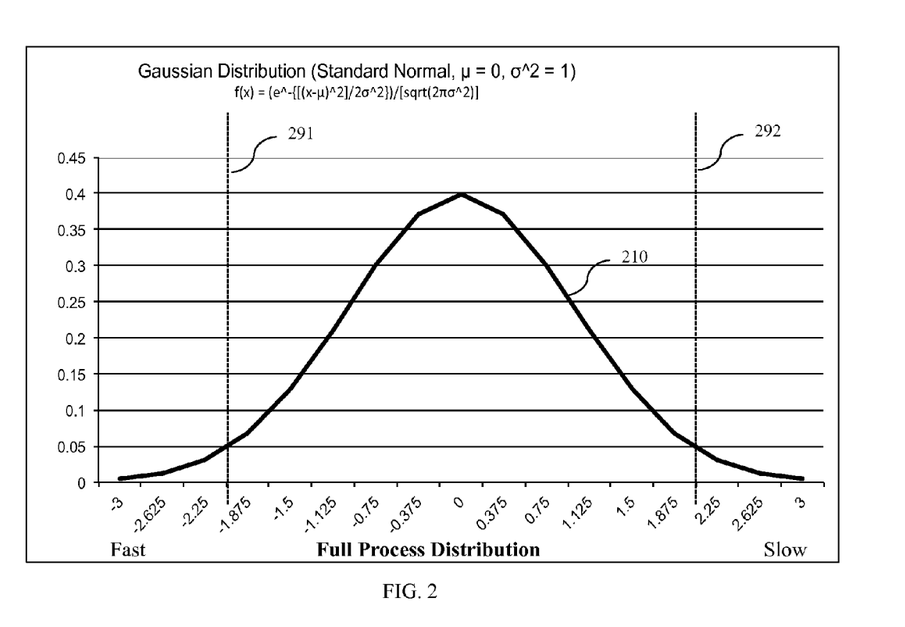
FIG. 2 is a graph illustrating an exemplary full process distribution for an IC chip design, including optional leakage power and performance screens.

Based on the results of the best case/worst case analysis, a full process distribution for the IC chip design can be generated and stored in the memory (108). FIG. 2 is a graph illustrating an exemplary full process distribution 210 for an IC chip design. This full process distribution 210 represents the predicted performance range for IC chips that would be manufactured according to the initial design and operating using a specific supply voltage. This predicted performance range extends from IC chips with relatively fast operating speeds (e.g., $-3\sigma$ fast IC chips) at one end of the full process distribution (i.e., the "fast" end of the process distribution) to IC chips with relatively slow operating speeds (e.g., $3\sigma$ slow IC chips) at the opposite end of the full process distribution (i.e., the "slow" end of the process distribution).

Optionally, once this process distribution 210 is defined, the process distribution 210 can be accessed and evaluated to determine whether or not a desired process parameter/performance parameter ratio (e.g., a desired leakage power/operating frequency ratio) falls at the center of the process distribution (i.e. at $0\sigma$). If not, one or manufacturing line processes can be adjusted in order to re-center the process distribution and, particularly, to ensure that the desired process parameter/performance parameter ratio falls at the center of the process distribution (110). Changes design to re-center the process distribution can include, but are not limited to, changes to the gate dielectric material and/or thickness, changes to the inter-/intra-layer dielectric material, changes to doping specifications (e.g., dopants, dopant concentration, etc.), changes to the interconnect material and/or the spacing between interconnects, and changes to manufacturing line processing equipment.

Optionally, once this process distribution 210 is defined, the process distribution 210 can be accessed and screen(s) 291-292 can be established at one or both ends of the process distribution 210 (112). Specifically, oftentimes after IC chips are manufactured according to an IC chip design, screens are established at one or both ends of the process distribution and used to "screen" or disposition specific IC chips so that such chips are prevented from being incorporated into a specific product. For example, a given product may have a specific leakage power specification and/or specific performance specifications for any IC chips incorporated therein. To ensure that the product's leakage power specification is met, a leakage power screen 291 of, for example, $-2\sigma$ fast is set such that no IC chips that are $-2\sigma$ fast or faster are incorporated into the product. To ensure that the product's performance specification is met, a performance screen 292 of, for example, $2\sigma$ slow is set such that no IC chips that are $2\sigma$ slow or slower are incorporated into the product. Knowing that such screen(s) will be put in place following manufacturing, they can be pre-emptively established and considered during design (e.g., at process 114 described below).

Figure 3:
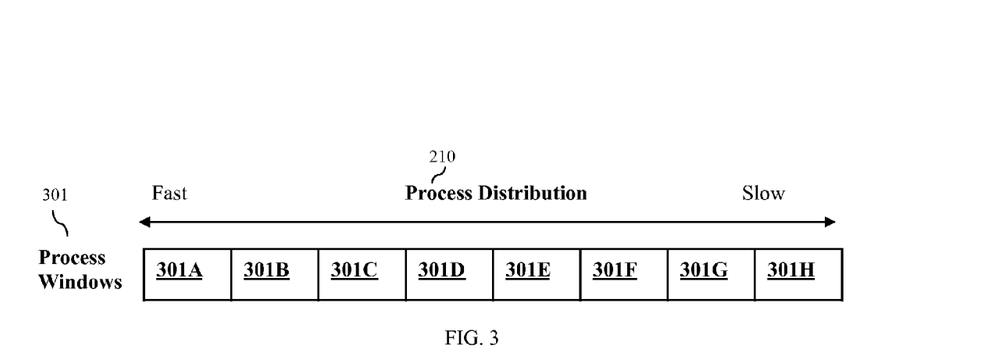
FIG. 3 illustrates the process distribution divided multiple process windows.

Next, the process distribution 210 can be divided into some number (M) of process windows (i.e., into some number (M) of successive intervals) from the fast end of the process distribution 210 to the slow end of the process distribution 210 (114). For illustration purposes, FIG. 3 shows the process distribution 210 divided into eight different process windows 301 from process window 301A at the fast end of the process distribution 210 to process window 301H at the slow end of the process distribution 210. FIG. 3 also shows that the process windows 301 are essentially uniform. That is, in FIG. 3, the process windows 301A-H each encompasses the same number of units of sigma. However, it should be understood that the use of eight uniform process windows is for illustration purposes only and that the number of process windows and/or the number of units sigma per process window may vary from process window to process window. It should also be noted that, if a leakage power screen 291 and/or a performance screen 292 is/are established at process 112, only that portion of the process distribution 210 defined by the screen(s) would be divided at process 114. Thus, for example, given the screens 291-292 shown in FIG. 2, only the portion of the process distribution 210 between the screens 291-292 from $-2\sigma$ fast to $2\sigma$ slow would be divided into process windows.

Figure 4:
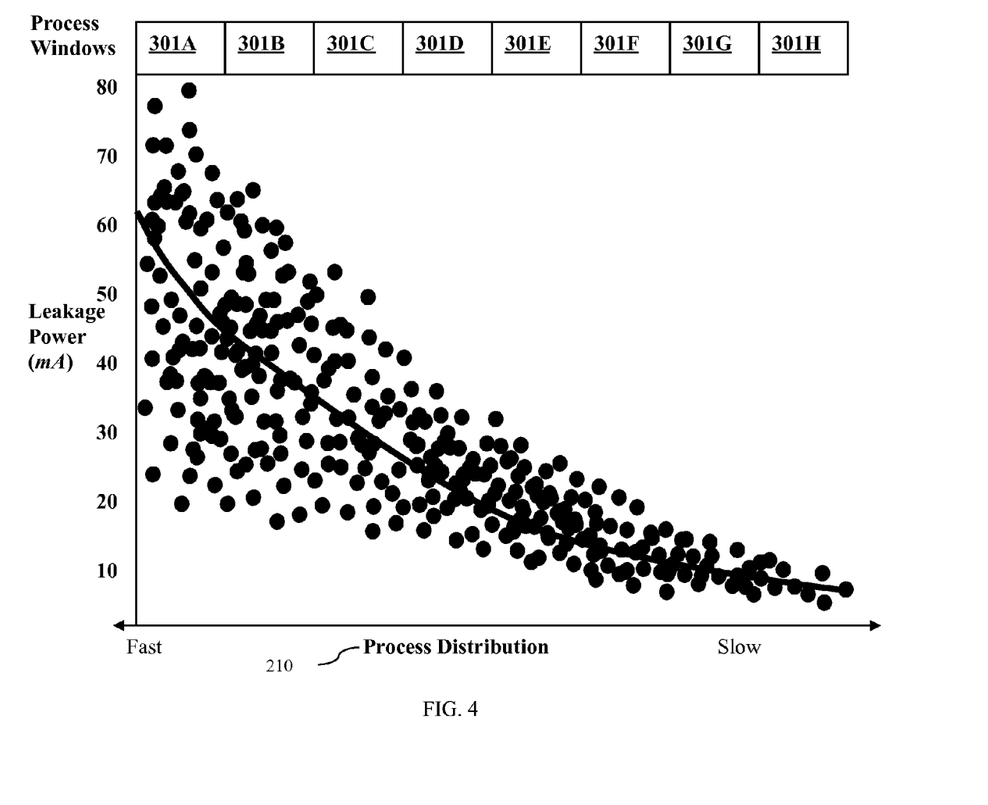
FIG. 4 is a graph illustrating exemplary leakage power predictions across the process distribution.
Figure 5A:
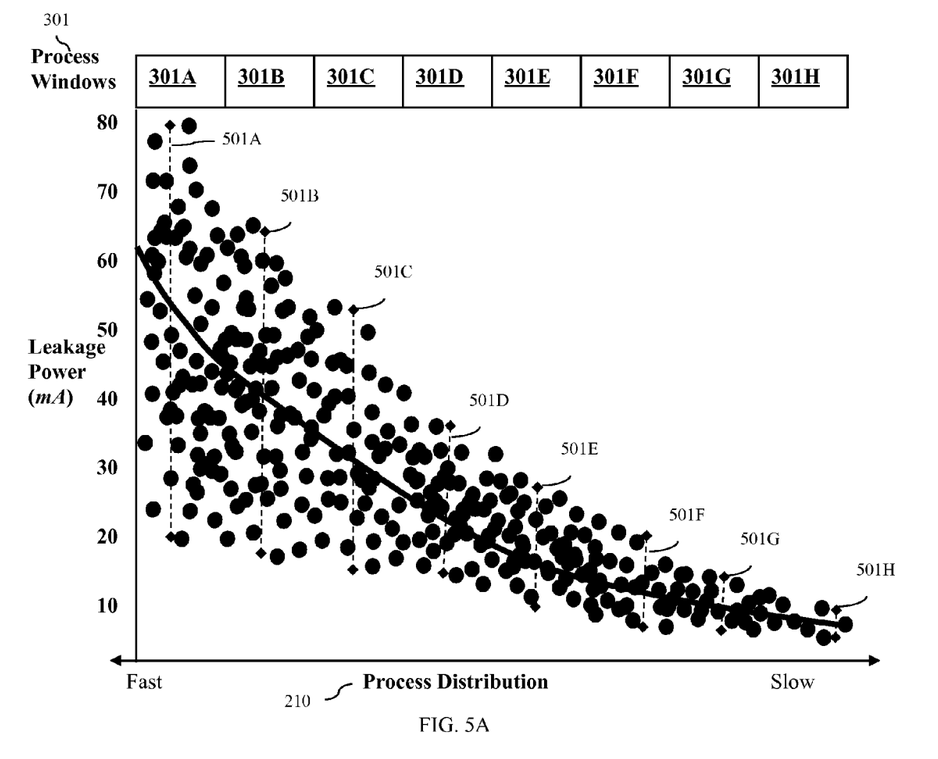
FIG. 5A is a graph illustrating the exemplary leakage power predictions across the process distribution and further illustrating widths of distributions for leakage power for each of the process windows in the process distribution.
Figure 5B:
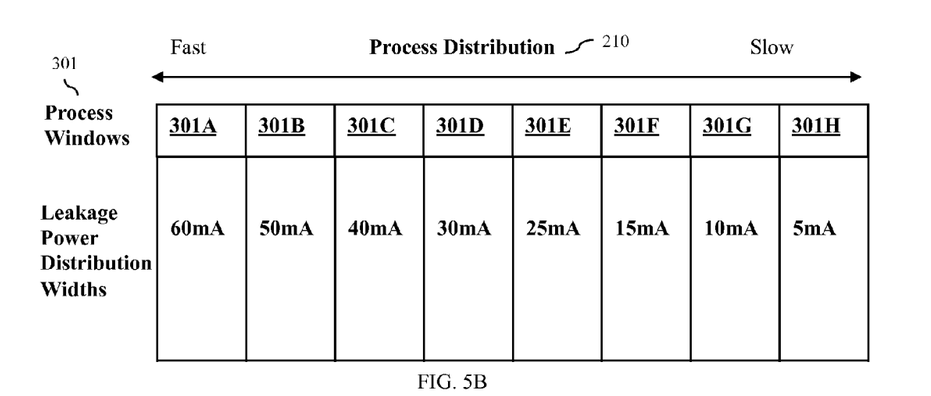
FIG. 5B is a table that specifies values for the widths of distribution for leakage power for each of the process windows.

In any case, models for a process parameter, such as leakage power or any other suitable process parameter that can impact a timing parameter (e.g., delay, slack, slew, or any other timing parameter) can be generated for each of the process windows 301A-H. Based on these models, process parameter widths of distribution associated with the process windows 301A-H, respectively, can be determined (116). For example, FIG. 4 is a graph that illustrates leakage power predictions across the full process distribution 210 and for each process window 301A-H. FIG. 5A shows the graph of FIG. 4 and further illustrates that the widths of distributions 501A-H for leakage power for each of the process windows 301A-H, respectively, varies from process window to process window and, more specifically, decreases from the fast end of the process distribution 210 to the slow end of the process distribution 210. Specifically, as shown in the table of FIG. 5B, which corresponds to the graph of FIG. 5A, the process window 301A is at the fast end of the process distribution 210 and, within this process window 301A, the predicted leakage power ranges from approximately 20 mA to approximately 80 mA. Thus, the width of distribution 501A of the leakage power for the process window 301A is approximately 60 mA. Process window 301B is near the fast end of the process distribution 210 and, within this process window 301B, the predicted leakage power ranges from approximately 15 mA to approximately 65 mA. Thus, the width of distribution 501B of the leakage power for the process window 301B is approximately 50 mA and so on. Finally, the process window 301H is at the slow end of the process distribution 210 and, within this process window 301H, the leakage power ranges from approximately 5 mA to approximately 10 mA. Thus, the width of distribution 501H of the leakage power for the process window 301H is approximately 5 mA.

Based on the widths of distribution 501A-H of the process parameter (e.g., leakage power) that were determined for the process windows 301A-H at process 116, timing parameter adjustment factors for the timing parameter at issue can be determined and assigned to the process windows 301A-H, respectively (118). These process window-specific adjustment factors (also referred to herein as process window-specific timing parameter penalties) can, for example, be calculated at process 118 by leveraging known/pre-characterized relationships between various aspects of the IC design. For example, it is known that there is a relationship between device leakage and Silicon Process, with 'fast' process allowing much more leakage than 'slow' process, and therefore requiring more power at fast process than slow process for otherwise equivalent designs. So, when the bounding projection is found to occur in a fast corner, a penalty may be applied to increase pessimism in this corner and steer the design towards slower corner solutions. This penalty (i.e., the adjustment factor) for each process window may be asserted as a constant to be multiplied by a subsequently determined solution for the timing parameter in order to arrive at an adjusted solution for the timing parameter (e.g., the constant can be a fraction of one or greater than one, depending upon the timing parameter at issue). Alternatively, this penalty may be asserted as a fixed amount of time (e.g., in picoseconds (ps)) to be used to adjust a subsequently determined solution for a timing parameter in order to arrive at an adjusted solution for the timing parameter (e.g., the fixed amount of time may be added to or subtracted from the subsequently determined solution, depending upon the timing parameter at issue). Alternatively, this penalty can be asserted as a fraction of some parameter sensitivity or canonical mean value, or otherwise derived from available data. Alternatively, the corner location ('sigma value') to which the canonical is projected may be increased relative to its original/default value in the fast corner, causing solutions in this corner to appear more pessimistic than they otherwise would. In addition to being a function of process corner, the adjustment factor may also be modified based on other relevant criteria such as timing test type (e.g. setup vs. hold), design information (e.g. no penalty is applied in regions of the chip deemed performance critical and where power may be a secondary concern), or similar.

Next, a timing analysis (e.g., another statistical static timing analysis (SSTA)) can be performed, given a nominal operating voltage, in order to acquire an initial timing solution including an initial solution for a timing parameter at issue (e.g., for delay, for slack, for slew, etc.) (120). The initial solution can include a set of statistical canonical models containing parameterized sensitivities to the sources of variation, which defines the timing response over the process space spanned by each canonical. For timing closure (i.e. to determine if the design satisfies all required timing constraints), the parameterized canonical timing model is projected to a single point in the process space, typically a bounding corner that represents the worst possible solution obtained by the canonical over the entire process space. It is this set of worst projected solutions that is presented to the design team in order to determine if all timing constraints are satisfied and the design may be considered complete (for example, the set of all timing slacks must be positive in sign to ensure that all clock/data signal alignments are appropriate and will result the desired latching of data signals). Techniques for performing timing analyses and, particularly, SSTA to determine a canonical model for a timing parameter such as delay, slack, slew, etc. are well known in the art. Thus, the details of such techniques are omitted from this specification in order to allow the reader to focus on the salient aspects of the disclosed methods.

Figure 6:
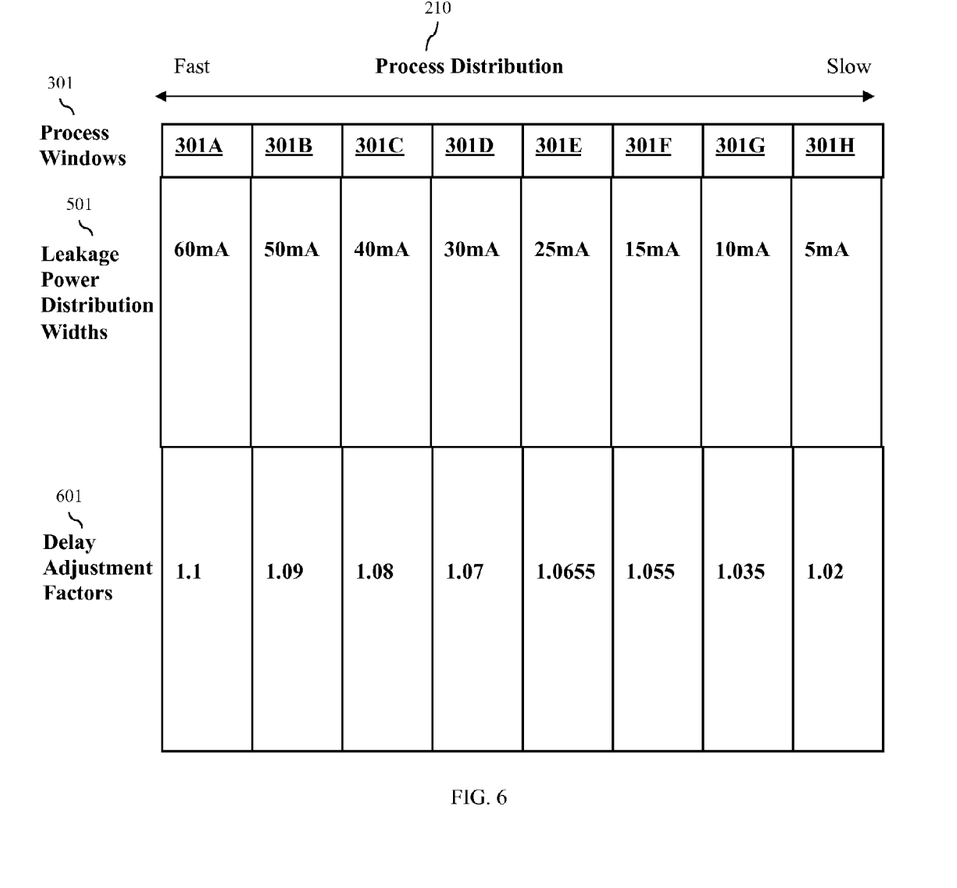
FIG. 6 is a table illustrating exemplary delay adjustment factors assigned to each of the process windows.

Once the initial solution for the timing parameter at issue (e.g., for delay, for slack, for slew, etc.) is determined at process 120, that initial solution can be adjusted for each specific process window using the process window-specific adjustment factors determined at process 118 in order to account for process window-to-process window variations in the widths of distribution of the process parameter (e.g., leakage power) (122). That is, once the initial timing solution, including an initial solution for the timing parameter at issue (e.g., for delay, for slack, for slew, etc.), is determined at process 120, the initial solution for that timing parameter at issue can be adjusted as part of the projection process and prior to presentation in order to adjust the pessimism contained in the quantity, such that the design team is steered away from undesirable states (or towards desirable states). Specifically, at process 122, a process window-specific adjusted solution can be determined for the canonical projection by modifying the initial projected solution. This projection adjustment may be performed in a number of ways. For illustration purposes, processes 118-122 are described in greater detail below with respect to the timing parameter of delay and FIG. 6 is a table illustrating exemplary delay adjustment factors 601 assigned to the process windows 301A-H, respectively, at process 118. As illustrated, these delay adjustment factors 601 vary depending upon the process window-to-process window variations in the previously determined widths of distribution of the process parameter. For larger widths of distribution, the delay adjustment factor is relatively large (e.g., greater than 1) and for smaller widths of distribution, the delay adjustment factor is relatively small (e.g., at or near 1). That is, as shown in the table of FIG. 6, the width of distribution of the leakage power for the process window 301A is relatively large (e.g., approximately 60 mA) and, thus, the delay adjustment factor is relatively large (e.g., 1.10). The width of distribution of the leakage power for the process window 301B is slightly smaller (e.g., approximately 50 mA) and, thus, the delay adjustment factor can be slightly smaller (e.g., 1.09) and so on. Finally, the width of distribution of the leakage power for the process window 301H is very small (e.g., approximately 5 mA) and, thus, the delay adjustment factor is also be very small (e.g., 1.02) or even as low as 1. In this case, for each specific process window, the initial solution for delay acquired at process 120 can be multiplied by the specific delay adjustment factor 601 previously determined at process 118 for that specific process window in order to arrive at the adjusted solution for delay for that specific process window at process 122. Thus, the adjusted solutions for delay nearer the fast end of the process distribution will be increased to a greater degree than those nearer the slow end of the process distribution, thereby adding an appropriate amount of pessimism to the timing analysis results and improving accuracy.

It should be understood that the values for the delay adjustment factors contained in the table of FIG. 6 are offered for illustration purposes and are not intended to be limiting. It should further be understood that the values for any timing parameter adjustment factors and whether those values are used to increase or decrease the timing parameter at issue (e.g., delay, slack, slew, etc.) at the fast end or slow end of the process distribution will depend upon whether or not increasing or decreasing the timing parameter at the fast end or slow end of the process adds the desired pessimism. Specifically, the net goal of timing parameter adjustment is to provide additional pessimism in order to steer the design towards some desirable state with respect to a process parameter (e.g., leakage power) that is not directly timing related. It should further be understood that if the initial solution for the timing parameter is in canonical form, the adjusted solutions for the timing parameter will also be in canonical form.

Given the adjusted solution for the timing parameter for each specific process window, a prediction can be made regarding whether or not IC chips manufactured according to the initial IC chip design will meet one or more predetermined timing requirements (e.g., required arrival time(s) (RAT(s))) regardless of where those IC chips fall within the process distribution (or, if applicable, within the portion of the process distribution defined by the screen(s)) (124). It should be noted that by using process-window specific timing parameter adjustment factors to adjust the initial value for a specific timing parameter (e.g., for delay, for slack, for slew, etc.) on a process window by process window basis, this technique adds pessimism to the timing analysis results to account for process window-to-process window variations in the widths of distribution of the process parameter and thereby ensures accuracy.

In any case, when a predetermined timing requirement will not met given the adjusted solutions for the timing parameter, the initial IC chip design can be altered (126) and the processes 104-124 described above can be iteratively repeated. When the predetermined timing requirement(s) will be met, the IC chip design can be finalized and released to manufacturing, where IC chips can be manufactured according to the final IC chip design (128).

Following manufacturing of IC chips according to the final IC chip design, selective voltage binning (SVB) can be performed (130). Specifically, the manufactured IC chips can be tested to acquire performance measurements (e.g., delay measurements). Based on the actual performance measurements, the manufactured IC chips can be sorted into different groups (referred to as voltage bins). These groups can correspond to the process windows 301A-H, described above. Additionally, different voltage ranges can be assigned to each process window such that relatively low voltage ranges are assigned to process windows at the "fast" end of the process distribution to optimize power consumption and relatively high voltage ranges are assigned to process windows at the "slow" end of the process distribution to optimize performance. Before such IC chips are shipped for incorporation into products, the voltage ranges associated with their respective voltage bins can be noted (e.g., hard programmed onto the IC chips). Operation of relatively fast IC chips at lower voltage ranges minimizes worst-case power consumption and operation of relatively slow IC chips at higher voltage ranges improves their performance (e.g., increases their operating speed/reduces their delay).

The method as described above is used in the design and fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Figure 7:
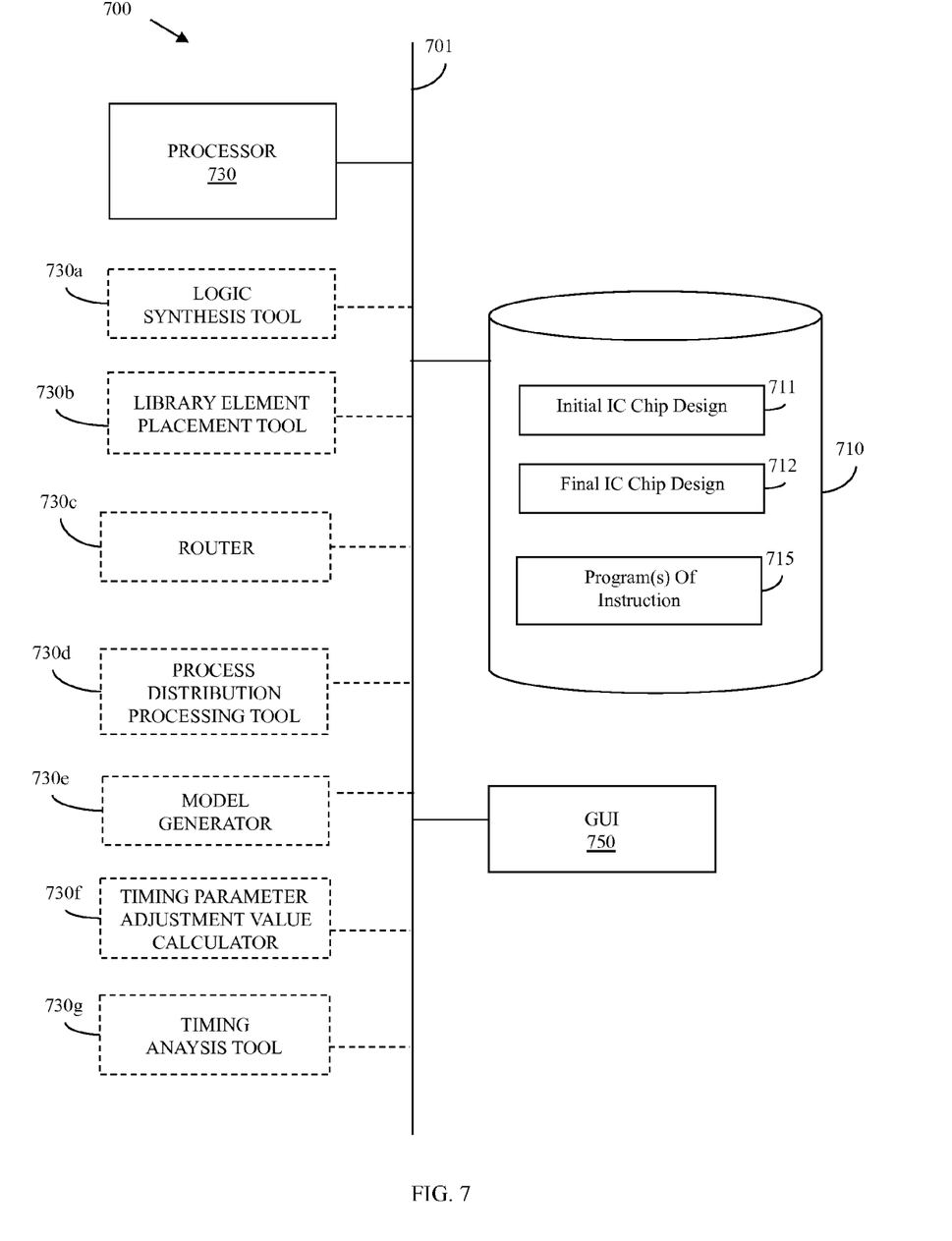
FIG. 7 is a schematic diagram illustrating an integrated circuit (IC) design system; and, FIG. 8 is a representative hardware environment (i.e., a computer system) for implementing the disclosed IC design methods and systems.

Referring to FIG. 7, also disclosed herein are systems 700 for integrated circuit (IC) chip design. Each design system 700 can incorporate at least one memory 710 (e.g., at least one computer readable storage medium, such as a computer readable storage device), a user interface 750 (e.g., a graphic user interface (GUI)) and at least one processor (e.g., 730 or 730a-h, see detailed discussion below). Components of the design system 700, including the processor(s), memory(ies) and GUI, can be interconnected over a system bus 701, as illustrated. Alternatively, any one or more of the components of the system 700 can communicate with any other component over a wired or wireless network.

The memory 710 can store program(s) of instruction 715 for performing the various processes described in detail below. The memory 710 can further store an initial design 711 for an IC chip. The initial design developed can be represented by a high-level description, which sets out the requirements for the IC chip. This high-level description can be stored in the memory (e.g., on a data storage device) in, for example, a hardware description language (HDL), such as VHDL or Verilog. Those skilled in the art will recognize that this high-level description will set out specifications for various parameters (e.g., for channel length, channel width, doping, spacer width, etc.). However, the actual values of those parameters may vary due to manufacturing process variations and, as a result, may impact the performance (e.g., operating speed, as indicated by delay) of manufactured IC chips.

As mentioned above, the design system 700 can incorporate at least one processor. Specifically, the design system 700 can incorporate a single specialized processor 730 (e.g., a single specialized computer processing unit) that, during IC design, performs (i.e., that is adapted to perform, that is configured to perform and/or that executes multiple programs of instructions 715 to perform) multiple process steps, as described in detail below. Alternatively, the design system 700 can incorporate multiple specialized processors 730a-h (e.g., multiple different specialized computer processing units) and, during IC design, each processor can perform (i.e., can be adapted to perform, can be configured to perform and/or can execute one or more specific programs of instructions 715 to perform) one or more of the multiple process steps, as described in detail below. For purposes of illustration, seven different special purpose processor(s) are shown in FIG. 7 including a logic synthesis tool 730a, a library element placement tool 730b, a wiring router 730c, a process distribution processing tool 730d, a model generator 730e, a timing parameter adjustment factor calculator 730f and a timing analysis tool 730g. It should be understood that FIG. 7 is not intended to be limiting and, alternatively, the multiple process steps, as described in detail below, can be performed by any number of one or more processors.

In the system 700, the processor 730 (or, if applicable, the logic synthesis tool 730a) can synthesize (e.g., can be adapted to synthesize, can be configured to synthesize or can execute a program of instructions 715 to synthesize) the initial design 711 for the IC chip and, particularly, the high-level description for the IC chip into low-level constructs (e.g., a gate-level netlist) using library elements (e.g., standard cells in standard cell ASIC design or gate array base cells in gate array ASIC design). After logic synthesis, the processor 730 (or, if applicable, the library element placement tool 730b) can place (e.g., can be adapted to place, can be configured to place or can execute a program of instructions 715 to place) the various library elements at specific locations on the IC chip. After library element placement, the processor 730 (or, if applicable, the wiring router 730(c)) can perform (e.g., can be adapted to perform, can be configured to perform or can execute a program of instructions 715 to perform) routing and, particularly, can define the wires that will interconnect the various library elements. Various different techniques for performing logic synthesis, placement and routing are well known in the art. Thus, the details of such techniques are omitted from this specification in order to allow the reader to focus on the salient aspects of the disclosed systems.

Next, the processor 730 (or, if applicable, process distribution processing tool 730d) can perform (e.g., can be adapted to perform, can be configured to perform or can execute a program of instructions 715 to perform) a best case/worst case analysis of a specific process parameter (e.g., leakage power) that can impact a specific timing parameter (e.g., delay, slack, slew or any other timing parameter), as discussed in greater detail above with regard to the method at process 106. Based on the results of the best case/worst case analysis, the processor 730 (or, if applicable, process distribution processing tool 730d) can define (e.g., can be adapted to define, can be configured to define or can execute a program of instructions 715 to define) the full process distribution for the IC chip design. FIG. 2 is a graph illustrating an exemplary full process distribution 210 for an IC chip design. This full process distribution 210 represents the predicted performance range for IC chips that would be manufactured according to the initial design and operating using a specific supply voltage. This predicted performance range extends from IC chips with relatively fast operating speeds (e.g., −3σ fast IC chips) at one end of the full process distribution (i.e., the "fast" end of the process distribution) to IC chips with relatively slow operating speeds (e.g., 3σ slow IC chips) at the opposite end of the full process distribution (i.e., the "slow" end of the process distribution).

Optionally, once this process distribution 210 is defined, the processor 730 (or, if applicable, process distribution processing tool 730d) can establish (e.g., can be adapted to establish, can be configured to establish or can execute a program of instructions 715 to establish) screens at one or both ends of the process distribution 210 (e.g., a leakage power screen 291 at the fast end of the process distribution and/or a performance screen 292 at the slow end of the process distribution, as shown in FIG. 2).

Next, the processor 730 (or, if applicable, process distribution processing tool 730d) can divide (e.g., can be adapted to divide, can be configured to divide or can execute a program of instructions 715 to divide) the process distribution 210 into some number (M) of process windows (i.e., into some number (M) of successive intervals) from the fast end of the process distribution 210 to the slow end of the process distribution 210. For illustration purposes, FIG. 3 shows the process distribution 210 divided into eight different process windows 301 from process window 301A at the fast end of the process distribution 210 to process window 301H at the slow end of the process distribution 210. FIG. 3 also shows that the process windows 301 are essentially uniform. That is, in FIG. 3, the process windows 301A-H each encompasses the same number of units of sigma. However, it should be understood that the use of eight uniform process windows is for illustration purposes only and that the number of process windows and/or the number of units sigma per process window may vary from process window to process window. It should also be noted that, if a leakage power screen 291 and/or a performance screen 292 is/are established as described above, only that portion of the process distribution 210 defined by the screen(s) would be divided into process windows. Thus, for example, given the screens 291-292 shown in FIG. 2, only the portion of the process distribution 210 between the screens 291-292 from −2σ fast to 2σ slow would be divided into process windows.

Then, for each of the process windows 301A-H, the processor 730 (or, if applicable, the model generator 730e) can generate (e.g., can be adapted to generate, can be configured to generate or can execute a program of instructions 715 to generate) models for a process parameter, such as leakage power or any other suitable process parameter that can impact a timing parameter (e.g., delay, slack, slew or any other timing parameter). Based on these models, the processor 730 (or, if applicable, the model generator 730e) can determine (e.g., can be adapted to determine, can be configured to determine or can execute a program of instructions 715 to determine) process parameter widths of distribution associated with the process windows 301A-H, respectively. For example, FIG. 4 is a graph that illustrates leakage power predictions across the full process distribution 210 and for each process window 301A-H. FIG. 5A shows the graph of FIG. 4 and further illustrates that the widths of distributions 501A-H for leakage power for each of the process windows 301A-H, respectively, varies from process window to process window and, more specifically, decreases from the fast end of the process distribution 210 to the slow end of the process distribution 210. Specifically, as shown in the table of FIG. 5B, which corresponds to the graph of FIG. 5A, the process window 301A is at the fast end of the process distribution 210 and, within this process window 301A, the predicted leakage power ranges from approximately 20 mA to approximately 80 mA. Thus, the width of distribution 501A of the leakage power for the process window 301A is approximately 60 mA. Process window 301B is near the fast end of the process distribution 210 and, within this process window 301B, the predicted leakage power ranges from approximately 15 mA to approximately 65 mA. Thus, the width of distribution 501B of the leakage power for the process window 301B is approximately 50 mA and so on. Finally, the process window 301H is at the slow end of the process distribution 210 and, within this process window 301H, the leakage power ranges from approximately 5 mA to approximately 10 mA. Thus, the width of distribution 501H of the leakage power for the process window 301H is approximately 5 mA.

Based on the widths of distribution 401A-H of the process parameter (e.g., leakage power) that were determined for the process windows 301A-H above, the processor 730 (or, if applicable, the timing parameter adjustment factor calculator 730f) can determine (e.g., can be adapted to determine, can be configured to determine, or can execute a program of instructions 715 to determine) timing parameter adjustment factors for the timing parameter at issue for each of the process windows 301A-H, respectively. As discussed in detail above with regard to the method at process 118, these process window-specific adjustment factors (also referred to herein as process window-specific timing parameter penalties) can, for example, be calculated by leveraging known/pre-characterized relationships between various aspects of the IC design. For example, it is known that there is a relationship between device leakage and Silicon Process, with 'fast' process allowing much more leakage than 'slow' process, and therefore requiring more power at fast process than slow process for otherwise equivalent designs. So, when the bounding projection is found to occur in a fast corner, a penalty may be applied to increase pessimism in this corner and steer the design towards slower corner solutions. This penalty (i.e., the adjustment factor) for each process window may be asserted as a constant to be multiplied by a subsequently determined solution for the timing parameter in order to arrive at an adjusted solution for the timing parameter (e.g., the constant can be a fraction of one or greater than one, depending upon the timing parameter at issue). Alternatively, this penalty may be asserted as a fixed amount of time (e.g., in picoseconds (ps)) to be used to adjust a subsequently determined solution for a timing parameter in order to arrive at an adjusted solution for the timing parameter (e.g., the fixed amount of time may be added to or subtracted from the subsequently determined solution, depending upon the timing parameter at issue). Alternatively, this penalty can be asserted as a fraction of some parameter sensitivity or canonical mean value, or otherwise derived from available data. Alternatively, the corner location ('sigma value') to which the canonical is projected may be increased relative to its original/default value in the fast corner, causing solutions in this corner to appear more pessimistic than they otherwise would. In addition to being a function of process corner, the adjustment factor may also be modified based on other relevant criteria such as timing test type (e.g. setup vs. hold), design information (e.g. no penalty is applied in regions of the chip deemed performance critical and where power may be a secondary concern), or similar.

Next, the processor 730 (or, if applicable, the timing analysis tool 730g) can perform (e.g., can be adapted to perform, can be configured to perform, or can execute a program of instructions 715 to perform) a timing analysis (e.g., another statistical static timing analysis (SSTA)) in order to acquire an initial solution for the timing parameter at issue (e.g., for delay, for slack, for slew, etc.) given an nominal operating voltage. The initial solution can include a set of statistical canonical models containing parameterized sensitivities to the sources of variation, which defines the timing response over the process space spanned by each canonical. For timing closure (i.e. to determine if the design satisfies all required timing constraints), the parameterized canonical timing model is projected to a single point in the process space, typically a bounding corner that represents the worst possible solution obtained by the canonical over the entire process space. It is this set of worst projected solutions that is presented to the design team in order to determine if all timing constraints are satisfied and the design may be considered complete (for example, the set of all timing slacks must be positive in sign to ensure that all clock/data signal alignments are appropriate and will result the desired latching of data signals). Techniques for performing timing analyses and, particularly, SSTA to determine a canonical model for a timing parameter such as delay, slack, slew, etc. are well known in the art. Thus, the details of such techniques are omitted from this specification in order to allow the reader to focus on the salient aspects of the disclosed systems.

Once the initial solution for the timing parameter (e.g., delay) is determined, the processor 730 (or, if applicable, the timing analysis tool 730g) can adjust (e.g., can be adapted to adjust, can be configured to adjust, or can execute a program of instructions 715 to adjust) that initial solution for each specific process window in order to account for process window-to-process window variations in the widths of distribution of the process parameter (e.g., leakage power). That is, once the initial timing solution, including an initial solution for the timing parameter at issue (e.g., for delay, for slack, for slew, etc.), is determined, the processor 730 (or, if applicable, the timing analysis tool 730g) can adjust the initial solution for that timing parameter at issue as part of the projection process and prior to presentation in order to adjust the pessimism contained in the quantity, such that the design team is steered away from undesirable states (or towards desirable states).

Specifically, the processor 730 (or, if applicable, the timing analysis tool 730g) can calculate the adjusted solution for the canonical projection by modifying the initial projected solution. This projection adjustment may be performed in a number of ways.

For illustration purposes, the processes performed by the system 700 are described in greater detail below with respect to delay. For example, FIG. 6 is a table illustrating exemplary delay adjustment factors 601 that can be assigned to the process windows 301A-H, respectively. As illustrated, these delay adjustment factors 601 vary depending upon the process window-to-process window variations in the previously determined widths of distribution of the process parameter. For larger widths of distribution, the delay adjustment factor is relatively large (e.g., greater than 1) and for smaller widths of distribution, the delay adjustment factor is relatively small (e.g., at or near 1). That is, as shown in the table of FIG. 6, the width of distribution of the leakage power for the process window 301A is relatively large (e.g., approximately 60 mA) and, thus, the delay adjustment factor is relatively large (e.g., 1.10). The width of distribution of the leakage power for the process window 301B is slightly smaller (e.g., approximately 50 mA) and, thus, the delay adjustment factor can be slightly smaller (e.g., 1.09) and so on. Finally, the width of distribution of the leakage power for the process window 301H is very small (e.g., approximately 5 mA) and, thus, the delay adjustment factor is also be very small (e.g., 1.02) or even as low as 1. In this case, for each specific process window, the processor 730 (or, if applicable, the timing analysis tool 730g) can multiply the initial solution for delay by the specific delay adjustment factor 601 for that specific process window in order to arrive at the adjusted solution for delay for that specific process window. Thus, the adjusted solutions for delay nearer the fast end of the process distribution will be increased to a greater degree than those nearer the slow end of the process distribution, thereby adding an appropriate amount of pessimism to the timing analysis results and improving accuracy.

It should be understood that the values for the delay adjustment factors contained in the table of FIG. 6 are offered for illustration purposes and are not intended to be limiting. It should further be understood that the values for any timing parameter adjustment factors and whether those values are used to increase or decrease the timing parameter at issue (e.g., delay, slack, slew, etc.) at the fast end or slow end of the process distribution will depend upon whether or not increasing or decreasing the timing parameter at the fast end or slow end of the process adds the desired pessimism. Specifically, the net goal of timing parameter adjustment is to provide additional pessimism in order to steer the design towards some desirable state with respect to a process parameter (e.g., leakage power) that is not directly timing related. It should further be understood that if the initial solution for the timing parameter is in canonical form, the adjusted solutions for the timing parameter will also be in canonical form.

Given the adjusted solution for the timing parameter for each specific process window, the processor 730 (or, if applicable, the timing analysis tool 730g) can predict (e.g., can be adapted to predict, can be configured to predict, or can execute a program of instructions 715 to predict) whether or not IC chips manufactured according to the initial IC chip design will meet one or more predetermined timing requirements (e.g., required arrival time(s) (RAT(s))) regardless of where those IC chips fall within the process distribution (or, if applicable, within the portion of the process distribution defined by the screen(s)). It should be noted that by using process-window specific timing parameter adjustment factors to adjust the initial value for the timing parameter (e.g., for delay) on a process window by process window basis, this technique adds pessimism to the timing analysis results to account for process window-to-process window variations in the widths of distribution of the process parameter and thereby ensures accuracy.

In any case, when a predetermined timing requirement will not met given the adjusted solutions for the timing parameter, the system 700 can alter the initial IC chip design and iteratively repeat the various processes described above.

When the predetermined timing requirement(s) will be met, the system 700 can finalize the IC chip design, can store the final IC chip design 712 in memory 710 and can release it to manufacturing, where IC chips can be manufactured according to the final IC chip design 712.

Also disclosed herein computer program product. The computer program product can incorporate a computer readable storage medium having program instructions embodied therewith. The program instructions can be executable by a computer to cause the computer to perform the above-described method. More specifically, the disclosed design techniques may be embodied as a method, a system and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may have copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein is an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which has one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
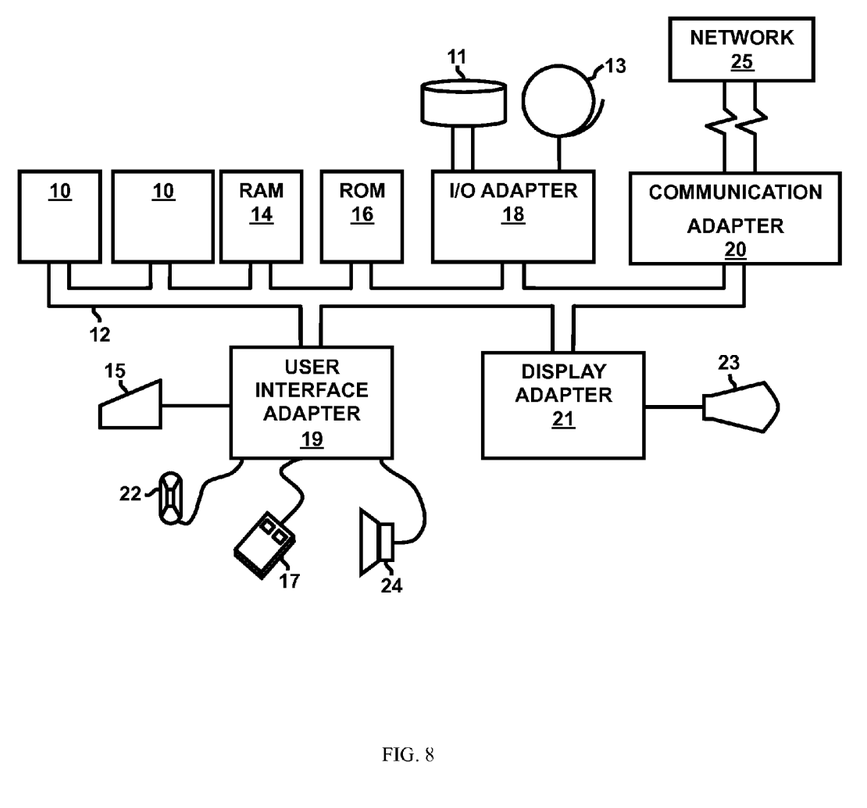

A representative hardware environment (i.e., a computer system) for implementing the above-described design methods, design systems and computer program product is depicted in FIG. 8. This schematic drawing illustrates a hardware configuration of an information handling/computer system in accordance with the embodiments herein. The system has at least one processor or central processing unit (CPU) 10. The CPUs 10 are interconnected via a system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the terminology used herein is for the purpose of describing the disclosed systems, methods and computer program products and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "on", "in direct contact", "abutting", "directly adjacent to", etc., are intended to indicate that at least one element physically contacts another element (without other elements separating the described elements). The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Therefore, disclosed above are design methods, systems and computer program products, which use a process window-aware timing analysis of an integrated circuit (IC) chip design for improved accuracy. Specifically, a process distribution for the IC chip design can be defined and divided into process windows. Timing parameter adjustment factors can be assigned to the process windows. A timing analysis can be performed on the IC chip design in order to acquire an initial solution for a timing parameter (e.g., delay). For each specific process window within the process distribution, this initial solution can be adjusted by a predetermined timing parameter adjustment factor assigned to that specific process window. The adjusted solutions for the different process windows can account for process window-to-process window variations in the widths of distribution of a process parameter (e.g., leakage power) that impacts the timing parameter and can be used to predict whether IC chips that are manufactured according to the design will meet established timing requirements (e.g., required arrival times (RATs)) regardless of where they fall within the process distribution.

What is claimed is:

1. A method comprising:
    dividing, by a processor, a process distribution for an integrated circuit chip design into process windows;
    determining, by the processor, widths of distribution for a process parameter in the process windows, respectively, the process parameter impacting a timing parameter;
    based on the widths of distribution of the process parameter, assigning, by the processor, timing parameter adjustment factors to the process windows, respectively;
    performing, by the processor, a timing analysis of the integrated circuit chip design to acquire an initial solution for the timing parameter;
    for each specific process window, determining, by the processor, an adjusted solution for the timing parameter by adjusting the initial solution using a specific timing parameter adjustment factor assigned to the specific process window; and,
    given the adjusted solution for the timing parameter, predicting, by the processor, whether integrated circuit chips manufactured according to the integrated circuit chip design will meet a predetermined timing requirement.

2. The method of claim 1, further comprising, when the predetermined timing requirement will not met, altering, by the processor, the integrated circuit chip design and repeating, by the processor, the determining of the widths of distribution, the assigning of the timing parameter adjustment factors, the performing of the timing analysis and the determining whether the integrated circuit chip design meets the predetermined timing requirement.

3. The method of claim 1, further comprising, when the predetermined timing requirement will met, manufacturing integrated circuit chips according to the integrated circuit chip design.

4. The method of claim 1, the process parameter comprising leakage power and the timing parameter comprising any of delay, slack and slew.

5. The method of claim 4, the widths of distribution and the timing parameter adjustment factors decreasing between a first end of the process distribution associated with a relatively fast operating speed and a second end of the process distribution associated with a relatively slow operating speed.

6. The method of claim 1, further comprising, before the dividing of the process distribution, adjusting, by the processor, manufacturing line processes in order to re-center the process distribution.

7. The method of claim 1, further comprising, before the dividing of the process distribution, establishing, by the processor, at least one of a leakage power screen at a first end of the process distribution associated with a relatively fast operating speed and a performance screen at a second end of the process distribution associated with a relatively slow operating speed.

8. The method of claim 1, further comprising assigning, by the processor, operating voltage ranges to the process windows so as to optimize power at a first end of the process distribution associated with a relatively fast operating speed and so as to optimize performance at a second end of the process distribution associated with a relatively slow operating speed.

9. A system comprising:
a memory storing an integrated circuit chip design and a process distribution for the integrated circuit chip design; and,
at least one processor in communication with the memory, the at least one processor performing the following:
accessing the process distribution and dividing the process distribution into process windows;
determining widths of distribution for a process parameter in the process windows, respectively, the process parameter impacting a timing parameter;
based on the widths of distribution of the process parameter, assigning timing parameter adjustment factors to the process windows, respectively;
performing a timing analysis of the integrated circuit chip design to acquire an initial solution for the timing parameter;
for each specific process window, determining an adjusted solution for the timing parameter by adjusting the initial solution using a specific timing parameter adjustment factor assigned to the specific process window; and,
given the adjusted solution for the timing parameter, predicting whether integrated circuit chips manufactured according to the integrated circuit chip design will meet a predetermined timing requirement.

10. The system of claim 9, the at least one processor further altering the integrated circuit chip design, when the predetermined timing requirement will not be met, and repeating the determining of the widths of distribution, the assigning of the timing parameter adjustment factors, the performing of the timing analysis and the determining whether the integrated circuit chip design meets the predetermined timing requirement.

11. The system of claim 9, the at least one processor further releasing the integrated circuit chip design to manufacturing, when the predetermined timing requirement will be met.

12. The system of claim 9, the process parameter comprising leakage power and the timing parameter comprising any of delay, slack and slew.

13. The system of claim 12, the widths of distribution and the timing parameter adjustment factors decreasing between a first end of the process distribution associated with a relatively fast operating speed and a second end of the process distribution associated with a relatively slow operating speed.

14. The system of claim 9, the at least one processor further, before the dividing of the process distribution, establishing at least one of a leakage power screen at a first end of the process distribution associated with a relatively fast operating speed and a performance screen at a second end of the process distribution associated with a relatively slow operating speed.

15. A computer program product comprising a computer readable storage medium, the computer readable storage medium storing program instructions, the program instructions being executable by a processor to cause the processor to perform a method, the method comprising:
dividing a process distribution for an integrated circuit chip design into process windows;
determining widths of distribution for a process parameter in the process windows, respectively, the process parameter impacting a timing parameter;
based on the widths of distribution of the process parameter, assigning timing parameter adjustment factors to the process windows, respectively;
performing a timing analysis of the integrated circuit chip design to acquire an initial solution for the timing parameter;
for each specific process window, determining an adjusted solution for the timing parameter by adjusting the initial solution using a specific timing parameter adjustment factor assigned to the specific process window; and,
given the adjusted solution for the timing parameter, predicting whether integrated circuit chips manufactured according to the integrated circuit chip design will meet a predetermined timing requirement.

16. The computer program product of claim 15, the method further comprising, when the predetermined timing requirement will not be met, altering the integrated circuit chip design and repeating the determining of the widths of distribution, the assigning of the timing parameter adjustment factors, the performing of the timing analysis and the determining whether the integrated circuit chip design meets the predetermined timing requirement.

17. The computer program product of claim 15, the method further comprising, when the predetermined timing requirement will be met, manufacturing integrated circuit chips according to the integrated circuit chip design.

18. The computer program product of claim 15, the process parameter comprising leakage power and the timing parameter comprising any of delay, slack and slew.

19. The computer program product of claim 18, the widths of distribution and the timing parameter adjustment factors decreasing between a first end of the process distribution associated with a relatively fast operating speed and a second end of the process distribution associated with a relatively slow operating speed.

20. The computer program product of claim 15, the method further comprising, before the dividing of the process distribution, performing at least one of adjusting manufacturing line processes to re-center the process distribution and establishing at least one of a leakage power screen at a first end of the process distribution associated with a relatively fast operating speed and a performance screen at a second end of the process distribution associated with a relatively slow operating speed.

* * * * *